Sept. 1, 1931.  A. AXELROD  1,820,900
MEANS FOR MELTING CHEESE
Filed Feb. 27, 1928
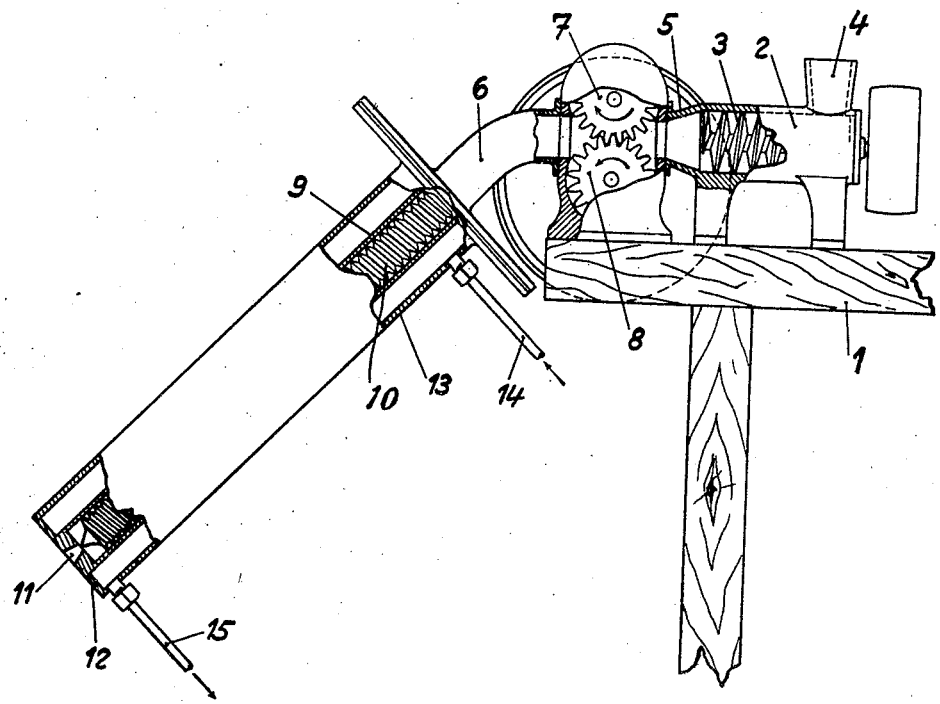
Inventor
Alexander Axelrod
By B. Singer atty.

Patented Sept. 1, 1931

1,820,900

UNITED STATES PATENT OFFICE

ALEXANDER AXELROD, OF ZURICH, SWITZERLAND

MEANS FOR MELTING CHEESE

Application filed February 27, 1928, Serial No. 257,426, and in Germany March 3, 1927.

The present invention relates to an improved method and to means for melting cheese especially such cheese as is now commonly sold in small boxes.

In the method of melting cheese now mostly in use a vacuum-evaporating and mixing apparatus is used. The cheese is brought in direct contact with live steam, or else the walls of mixing and kneading vessels are heated from the outside by steam or by some other heating agent. The cheese when heated is then taken out and is put in moulds, etc. These methods have very many and most serious drawbacks. The cheese has to be heated for a long time to get the whole mass thoroughly and uniformly heated, it frequently happens that some of the cheese is overheated. While the cheese is heated the air is sucked off and with the air, most valuable aromatic constituents of the cheese pass off. The flavor of the cheese is seriously affected.

The main object of the invention is to obviate the drawbacks aforesaid and I attain this and other objects by pressing comminuted cheese with the usual and known ingredients, spices, etc. in a continuous stream through a narrow channel the walls of which are heated. The mass after having passed said channel is pressed through a nozzle by which the doughy mass is intimately mixed.

For the performance of said process I provide a jacketed tube through which the cheese is pressed in a thin annular layer, a core being arranged within said tube. The cheese by passing over the externally heated walls of the tube is uniformly heated and passes through one or more nozzles at the end of the tube. To press the cheese through the annular channel any suitable press or device which creates a continuous and uniform pressure on the cheese may be used.

In the accompanying drawings the preferred mode of construction of the new device is shown in a diagrammatical manner, in a sectional elevation.

On a support 1 a power driven feeding device 2 is arranged having a screw 3 by which the cheese, fed into a hopper 4 in a comminuted state, is pressed into the casing 5. The cheese is pressed into a tube 9 by means of two toothed gears 7, 8 meshing with each other and having sufficient backlash to feed the cheese in its comminuted state on to the tube 9. Within the tube 9 is arranged a screw threaded core 10 of metal. The cheese passing along the said screw thread leaves the tube 9 by a nozzle 11 which is arranged in the end wall 12 of the tube 9. The tube 9 is surrounded by a steam jacket 13, steam is admitted by a pipe 14 and passes off through a pipe 15. While the cheese passes along the screw thread of the core it remains in close contact with the heated wall of tube 9 and melts. The liquid mass passes through the nozzle 11. The issuing cheese is intimately mixed. While the cheese is being heated air has no access thereto the heating is effected gradually and continually, the temperature may be controlled by controlling the heat of the steam and no portion of the cheese will ever be overheated. The cheese retains its flavor. The heating may be effected with hot water or by any other means. The core 10 may be made flat outside or hollow and may be connected to a steam or hot water supply pipe to heat the cheese layer from both sides. The core 10 moreover may be rotatably mounted within the tube 9 and by rotating the screw threaded core the feeding of the cheese through the tube 9 will be assisted.

What I wish to secure by U. S. Letters Patent:—

A device to melt cheese comprising a tube of circular cross-section, a cylindrical core of less diameter within said tube, means forming a hollow chamber surrounding said tube adapted to receive a heating agent, and intermeshing toothed gears adapted to feed comminuted cheese through the annular space between said tube and said core.

In testimony whereof I affix my signature.

ALEXANDER AXELROD.